(12) United States Patent
Schindler

(10) Patent No.: US 9,975,054 B2
(45) Date of Patent: May 22, 2018

(54) BUILDING BLOCK KIT

(71) Applicant: Melvin Schindler, East Brunswick, NJ (US)

(72) Inventor: Melvin Schindler, East Brunswick, NJ (US)

(*) Notice: Subject to any disclaimer, the term of this patent is extended or adjusted under 35 U.S.C. 154(b) by 369 days.

(21) Appl. No.: 14/738,428

(22) Filed: Jun. 12, 2015

(65) Prior Publication Data

US 2016/0008727 A1    Jan. 14, 2016

Related U.S. Application Data

(60) Provisional application No. 61/997,876, filed on Jun. 12, 2014.

(51) Int. Cl.
*A63H 33/04* (2006.01)
*A63H 3/16* (2006.01)
(Continued)

(52) U.S. Cl.
CPC .............. *A63H 3/16* (2013.01); *A63H 33/04* (2013.01); *B32B 3/06* (2013.01); *B32B 7/06* (2013.01); *B32B 7/12* (2013.01); *B32B 27/065* (2013.01); *G06F 3/04815* (2013.01); *A63H 2200/00* (2013.01); *B32B 2307/10* (2013.01); *B32B 2307/402* (2013.01); *B32B 2307/412* (2013.01);
(Continued)

(58) Field of Classification Search
None
See application file for complete search history.

(56) References Cited

U.S. PATENT DOCUMENTS 6,766,571 B1    7/2004    Bain et al.
2002/0113778 A1*    8/2002    Rekimoto ............... G06F 3/046
                                                                345/173
(Continued)

FOREIGN PATENT DOCUMENTS

CN    201454052 U    5/2010
CN    201643725 U    11/2010
(Continued)

OTHER PUBLICATIONS

Colin Barras, Smart Lego blocks take touch screens into 3D, Oct. 6, 2009, https://www.newscientist.com/article/dn17919-smart-lego-blocks-take-touch-screens-into-3d/.*
(Continued)

*Primary Examiner* — Jason Yen
(74) *Attorney, Agent, or Firm* — Merchant & Gould P.C.

(57) ABSTRACT

Building units include at least one microporous structure which permits the building units to connect with other building units or to another nonporous structure, such as a window or a wall in order to build a three dimensional structure. In some configurations the building units include a body, at least one surface having a nonporous structure, and at least one surface having an exposed microporous suction structure. Some embodiments also include a computing device such as a computer or television including a display device having a nonporous surface. The computing device generates a user interface to interact with the user. The user interface guides the user in constructing a three dimensional structure for the building units on a nonporous surface of the display device.

14 Claims, 17 Drawing Sheets

(51) Int. Cl.
*G06F 3/0481* (2013.01)
*B32B 3/06* (2006.01)
*B32B 7/12* (2006.01)
*B32B 7/06* (2006.01)
*B32B 27/06* (2006.01)

(52) U.S. Cl.
CPC ..... *B32B 2307/51* (2013.01); *B32B 2307/726* (2013.01); *B32B 2307/7242* (2013.01)

(56) References Cited

U.S. PATENT DOCUMENTS

| | | | |
|---|---|---|---|
| 2004/0001944 A1 | 1/2004 | Katsuhiko | |
| 2006/0152345 A1 | 7/2006 | Aikenhead | |
| 2008/0126927 A1* | 5/2008 | Jha | G06F 3/0488 715/700 |
| 2012/0108138 A1 | 8/2012 | Walterscheid | |
| 2012/0212427 A1* | 8/2012 | Li | G06F 3/0488 345/173 |
| 2013/0288560 A1* | 10/2013 | Abou-Hamda | A63H 33/005 446/175 |
| 2013/0324241 A1* | 12/2013 | Elliott | A63F 13/90 463/31 |
| 2014/0044920 A1 | 2/2014 | Nguyen et al. | |

FOREIGN PATENT DOCUMENTS

| | | |
|---|---|---|
| CN | 203989877 U | 12/2014 |
| JP | 5481324 B2 | 4/2014 |
| TW | 387693 | 9/2010 |
| WO | 2014127288 A1 | 8/2014 |

OTHER PUBLICATIONS

Usama Ghufran, Augmented Reality Building Blocks, Mar. 11, 2011, https://www.youtube.com/watch?v=3mis_IdAgPc.*
Box.Co.UK, Steel Series Free Touch Screen Gaming Controls, Apr. 14, 2015, 3 pages.
UM! Brands, Defy Gravity, available prior to Jun. 12, 2015, 11 pages.
EXEL Trading Co., Ltd., Technical Data: REGABOND-S, available prior to Jun. 12, 2015, 1 page.
EXEL Trading Co., Ltd., Technical Data: REGABOND-S (Adhesive side), available prior to Jun. 12, 2015, 1 page.
EXEL Trading Co., Ltd., Material Safety Sheet Data for REGABOND-S, Feb. 5, 2001, 3 pages.
EXEL Trading Co., Ltd., Technical Report: Durability Data of REGABOND-S, available prior to Jun. 12, 2015, 1 page.

* cited by examiner

BUILDING BLOCK KIT

CROSS-REFERENCE TO RELATED APPLICATION(S)

This application claims priority to U.S. application Ser. No. 61/997,876, filed Jun. 12, 2014, and titled "Craft/toy/art kit for the construction and reversible attachment of three dimensional assemblages to nonporous surfaces employing nano/micro-suction cups," the disclosure of which is hereby incorporated by reference in its entirety.

BACKGROUND

Building block kits utilize one of a variety of different mechanisms to connect the building blocks together. Several common types of building blocks, such as those sold under the LEGO® and MEGABLOCK® trademarks, utilize rigid protrusions and correspondingly shaped recesses that allow the building blocks to be connected together. Although this configuration can work well for connecting the blocks together, the blocks cannot be easily connected to any other object unless the other object is specifically designed with the same protrusions or recesses. Further, the blocks can only be connected together in a limited number of ways, for example, the blocks typically need to be connected end-to-end and cannot be fastened together at their sides or at an angle. Further, once the blocks are firmly connected together, it can be difficult to separate them, especially for a child with limited strength or dexterity. Additionally, such blocks are typically made of a hard plastic which can scratch other objects that they come in contact with, or cause injury to people, such as when improperly handled by children or when stepped, sat, or laid upon.

SUMMARY

In general terms, this disclosure is directed to building units such as building blocks. In some configurations and by non-limiting example, the building units include at least one surface having a microporous suction structure that allows the building units to adhere to one another or to other nonporous surfaces. In some embodiments the building units also include at least one surface having a nonporous structure. The microporous suction structure of the building units are connectable with either the nonporous structure or a microporous suction structure of other building units in order to form a three dimensional structure from the building units. Various aspects are described in this disclosure, which include, but are not limited to the following aspects.

One aspect is a building unit comprising: a body comprising at least a first body surface and a second body surface; a first external layer comprising a nonporous film arranged on the first body surface; and a second external layer comprising a microporous suction sheet arranged on the second body surface, wherein the microporous suction sheet is attached to the second body surface by an adhesive layer.

Another aspect is a system of adhering elements to a surface, wherein the system comprises: a plurality of building units wherein a building unit comprises: a body comprising at least a first body surface and a second body surface, a first external layer comprising a nonporous film wherein the nonporous film is attached to the first body surface by a first adhesive layer, a second external layer comprising a microporous suction sheet wherein the microporous suction sheet is attached to the second body surface by a second adhesive layer, and a nonporous surface.

A further aspect is a system for facilitating interaction on a computing device comprising: a computing device comprising a graphical user interface wherein the graphical user interface comprises a nonporous surface and a plurality of building units wherein a building unit comprises: a body comprising at least a first body surface and a second body surface, a first external layer comprising a nonporous film wherein the nonporous film is attached to the first body surface by a first adhesive layer, a second external layer comprising a microporous suction sheet wherein the microporous suction sheet is attached to the second body surface by a second adhesive layer.

Another aspect is a method for facilitating interaction between a computing device and a plurality of building units, the method comprising: receiving a user interface application to the computing device comprising a graphical user interface wherein the graphical user interface comprises a nonporous surface; and displaying the graphical user interface on the nonporous surface.

Yet another aspect is a building unit comprising a body, a first surface, and a second surface, wherein the first surface has a nonporous structure, and wherein the second surface has an exposed microporous suction structure.

DETAILED DESCRIPTION

Figure 1:
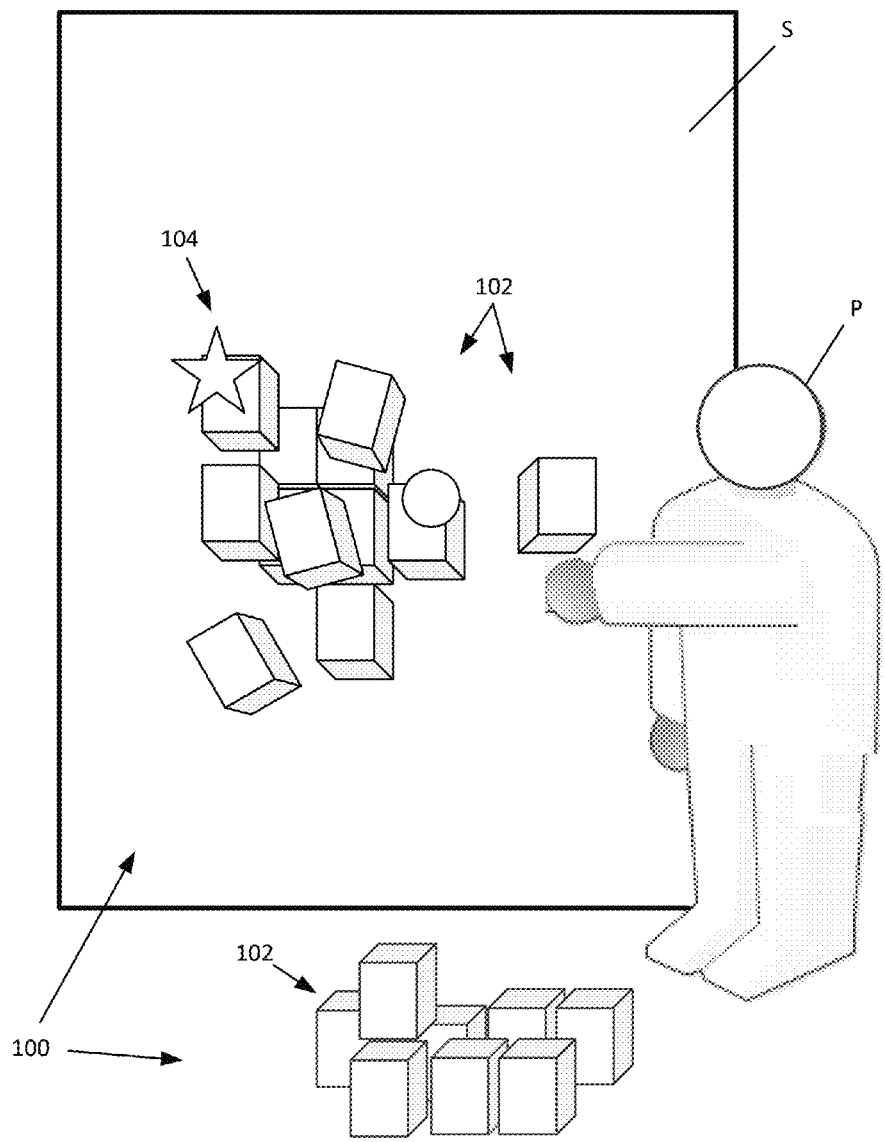
FIG. 1 is a perspective diagram illustrating an example building block kit including a plurality of building blocks.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

At least some embodiments according to the present disclosure relate to building units that can be used to construct three-dimensional structures by connecting the building units to each other and/or to other objects. One example of a building unit is a building block. Building units are often made, sold, and used as a collection of building units, referred to herein as a building unit kit. In some embodiments a building unit kit may also include objects in addition to the collection of building blocks. For simplicity, the present disclosure refers to a number of example embodiments involving building block kits and building blocks, but it is recognized that these examples can similarly apply to other building units, regardless of whether such building units take the form of blocks. As discussed herein, the building units can be made in many different sizes, colors, shapes, and configurations.

FIG. 1 is a perspective diagram illustrating an example building block kit 100 including a plurality of building blocks 102. In this example, a person P is depicted during the construction of a three-dimensional structure 104 using the building block kit 100. Also in this example, the three-dimensional structure 104 is shown being constructed on a nonporous surface S, such as a wall or a window.

The building block kit 100 contains a plurality of building blocks 102. In at least some embodiments the building blocks 102 include at least one surface having a microporous suction structure that allows the building blocks 102 to connect with other building blocks 102 and/or to other nonporous surfaces. One example of a building block 102 is illustrated and described in more detail with reference to FIG. 2, while other examples of building blocks are also described herein.

Due to the ability of the microporous suction structure of the building blocks 102 to connect with nonporous surfaces, the building blocks 102 can be connected to or used to build three-dimensional structures on a variety of different surfaces, and at a variety of different orientations. For example, although the building blocks 102 can be connected to a horizontal surface such as a table or a floor, they can also be connected to a vertical surface such as a window of a building or vehicle, a surface of an appliance (refrigerator, dishwasher, oven, microwave, etc.), walls, or even curved or angled surfaces such as a curved lamp or a railing. Accordingly, as illustrated in FIG. 1, the building blocks 102 can be used to construct three-dimensional structures 104 that extend horizontally out from a vertical surface, unlike traditional building blocks. In another embodiment, respective building blocks can be marked with indicators to indicator appropriate connecting points for erecting particular structures.

Figure 2:
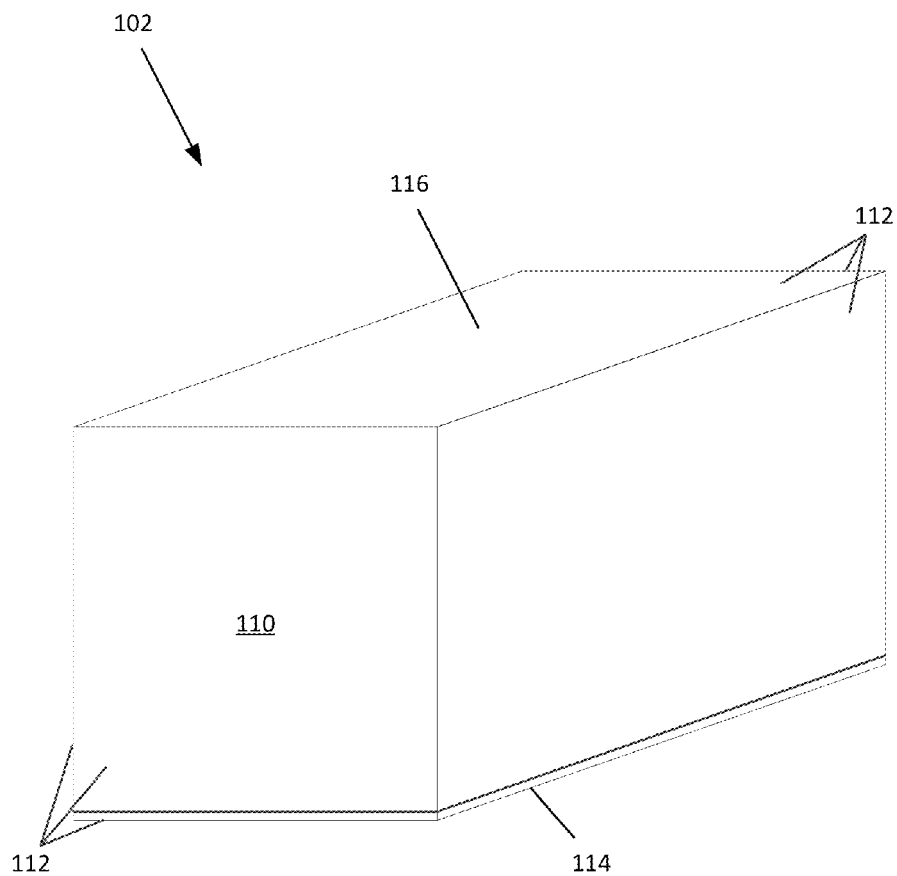
FIG. 2 is a perspective view of an embodiment of a building block.

FIG. 2 is a perspective view of an example building block 102. This example of the building block 102 includes a body 110 and a plurality of exterior surfaces 112. In this example, the building block 102 includes at least one surface 114 having an exposed microporous structure (also referred to as a microporous suction surface 114) and at least one surface 116 having a nonporous structure (also referred to as a nonporous surface 116).

In this example the building block 102 includes a body 110 that forms the central body of the building block 102. In some embodiments the body 110 is a solid (not hollow) body formed of one or more materials, such as plastic, wood, metal, foam and the like. In one example embodiment, the body is formed of a foam material, as discussed in further detail herein.

In the illustrated example the building block 102 (and the body 110) has a shape of a parallelepiped, and more specifically a rectangular cuboid, such that the building block 102 has six exterior surfaces 112. Other embodiments of building blocks can have other shapes, sizes, and configurations, and further some building block kits 100 (FIG. 1) include a variety of differently shaped, sized, and/or configured building blocks 102 within the same kit 100, allowing greater flexibility in the design of three-dimensional structures 104.

Additionally, some embodiments include building units which can be made with any number of sides (at least one or more) and having an endless number of possible shapes and sizes. Several examples of building unit shapes include prisms, cones, spheres, and cylinders. Building units can also be made in the form of a person, fictional character, animal, or any one of a variety of possible objects. Building units can also be made in decorative shapes, such as to form a decorative frame or border, in the form of a portion of a person or character, such as including portions of a face (eyes, nose, ears, mouth, etc.), or in the form of wearing apparel such as hats, glasses, clothing, and the like.

As discussed above, some embodiments include at least one exposed microporous suction surface 114. In some embodiments a surface of the body 110 forms the microporous suction surface 114, while in other embodiments the microporous suction surface 114 is formed as a separate layer that is connected to a surface of the body 110. In an embodiment the microporous suction surface 114 is manufactured from a substrate such as an elastomer or other flexible material. In some embodiments the microporous suction surface 114 is infused with a plurality of micropores. The plurality of micropores function as a plurality of microminiature suction cups, that can be used to connect the building block 102 with another nonporous surface or to another microporous suction surface. An example of the microporous suction surface 114 is illustrated and described in further detail with reference to FIG. 10.

Additionally, some embodiments include at least one nonporous surface 116. In some embodiments at least one surface of the body 110 is formed of a nonporous material, such that the surface of the body 110 itself is the nonporous surface. In other embodiments, such as when the body 110 is formed of foam or another porous material, a separate nonporous layer can be provided and connected to a surface of the body 110 to provide a nonporous surface 116. In at least some embodiments the nonporous layer is impermeable to air, water, or other fluids. In some embodiments, the surface can be comprised of a coating or film that is applied to an exterior surface of a body 110. The film may be applied by painting or spraying a substance, such as polyurethane, shellac, or Polycrylic® (MINWAX), on the block body 110. In other embodiments a nonporous layer such as cellophane or polyethylene is adhered or otherwise fastened to an exterior surface of the body 110.

The example building block illustrates only a single microporous suction surface and only a single nonporous surface. Other embodiments can include two or more microporous suction surfaces and/or two or more nonporous surfaces. For example, one embodiment includes a single microporous suction surface with the remaining surfaces being nonporous surfaces. This configuration allows the microporous suction surface of one building block to be connected to any of the multiple nonporous surfaces of another building block, which allows three-dimensional structures to be built in many configurations, and does not limit the construction to end-to-end fastening of building blocks to one another. In other words, building blocks can be connected by one end to any one of the sides of another building block.

Figure 3:
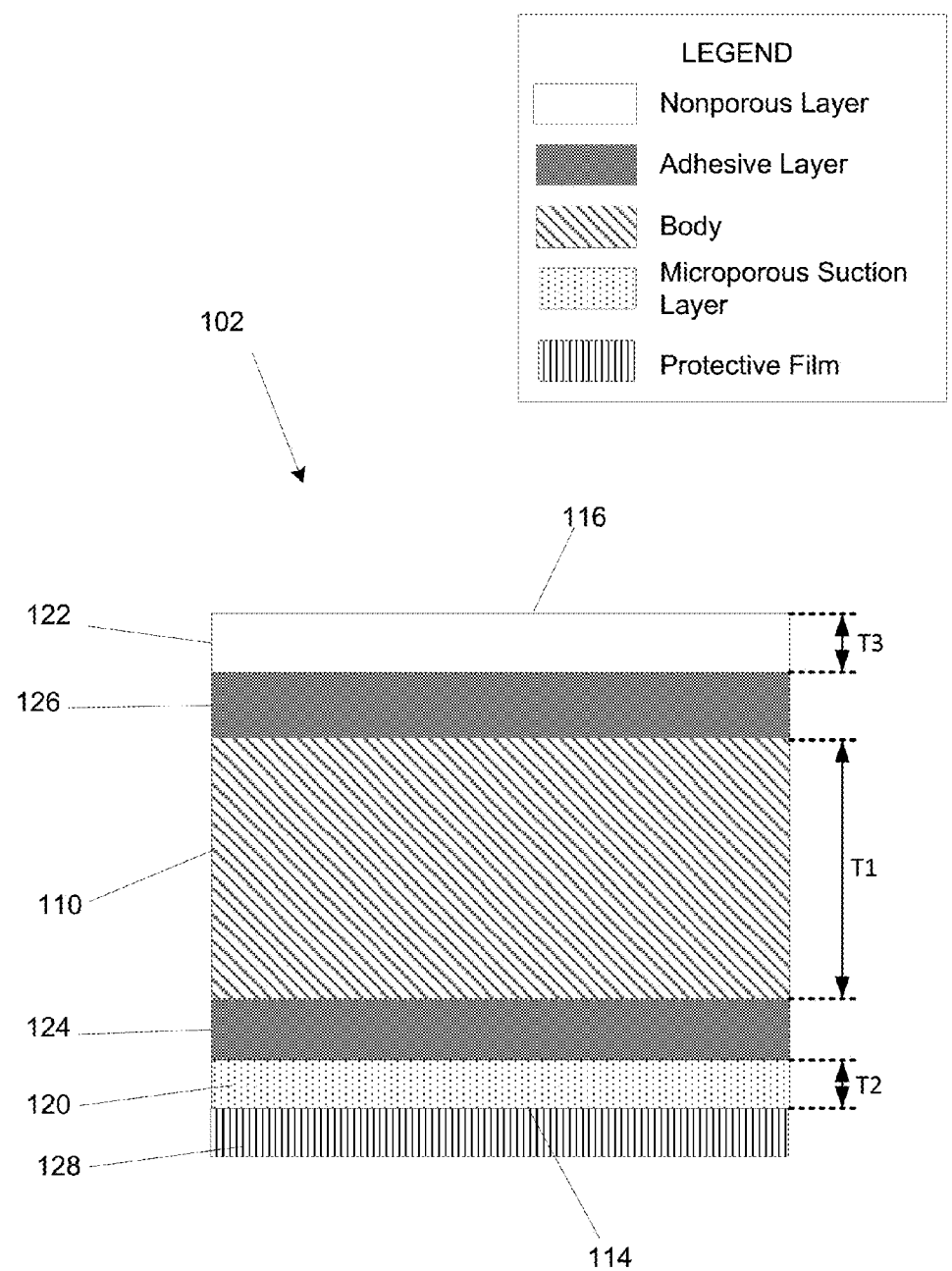
FIG. 3 is a cross-sectional view of an embodiment of a building block.

FIG. 3 is a cross sectional view of another example building block 102. In this example, the building block 102 includes multiple layers. In this example, the building block 102 includes the body 110, the microporous suction surface 114, the nonporous surface 116, a microporous suction layer 120, a nonporous layer 122, adhesive layers 124 and 126, and a protective layer 128. One or more additional surfaces can include additional nonporous layer(s) and/or microporous layer(s) as desired in yet other embodiments.

In this example, the microporous suction surface 114 is provided by a microporous layer 120 that is connected to a surface of the body 110 by the adhesive layer 124.

Similarly, the nonporous surface 116 is provided by a nonporous layer 122 that is connected to another surface of the body 110 by the adhesive layer 126.

In another possible embodiment one or more of the microporous layer 120 and the nonporous layer 122 can be connected directly to a surface of the body 110 (such as by coating or painting), or alternatively provided as separate layers that are connected to the body 110 by adhesive or another fastener. For example, in some embodiments the layers are coated, painted, sprayed, applied, or otherwise deposited onto the surface. Additional processing steps can be performed to obtain the desired characteristics, including the addition of the microporous structures (for the microporous suction surface 114) or removal, covering, or filling of pores (for the nonporous surface 116).

Additionally, some embodiments include a protective releasable film 128, such as a thin sheet of plastic or other film layer.

As discussed earlier, the nonporous layer 122 should be sufficiently impermeable to fluids, such as air, so as to allow the microporous suction layer 120 to maintain suction for a sufficiently long period of time (e.g., at least one hour, one day, one week, one month, or one year) when it is connected to the nonporous layer 122. In at least some embodiments the nonporous layer is of sufficient thickness to maintain impermeability of the surface, while being thin enough to not significantly interfere with the natural elasticity of the body 110 material. Because the nonporous layer can be formed as a thin coating, a suitable thickness can be as thin as about 100 nm. In addition, the adhesive layer 126 should provide sufficient adhesive strength to insure that the nonporous layer 122 does not disengage from the body 110 during use. In another embodiment, a microporous suction layer 120 can be used to attach the building block 102 to the nonporous surface S (FIG. 1). The thickness of the layer should be sufficient to provide adequate suction to at least insure that the weight of the block could be supported, and preferably the weight of at least several blocks.

In some embodiments the microporous suction layer 120 is formed of a transparent material allowing the microporous suction layer 120 to be transparent. This allows a surface of the body 110 to be visible through the microporous suction layer 120.

In some embodiments, the microporous suction layer 120 is formed of a compressible material, such as an elastomer or an acrylic foam. To protect the pores in the foam from collecting dust or other debris during manufacturing or storage, the microporous suction layer 120 may be covered by a releasable film 128. The releasable film 128 may be attached to the layer by an adhesive whose bond can be easily broken by pulling the film away from the surface of the microporous suction layer 120, to expose the microporous suction layer 120. However, even if the microporous suction layer 120 does collect dust or other debris, whether during manufacturing, storage, or use, it can be easily cleaned with water or other cleaner. For example, the microporous suction layer 120 can be simply rinsed off with water. When washed in water, the dirt or other debris is released from the microporous suction surface 114 of the microporous suction layer 120 leaving the microporous suction surface 114 clean and free of the dirt or debris. In other instances when water is insufficient to remove hydrophobic particles, a tacky material such as adhesive tape or a lint remover roll may be employed to remove the remaining particles. Accordingly, the microporous suction material is reversible meaning it is reusable again and again without having to modify the building unit or the surfaces, except perhaps for a periodic cleaning as noted above. Another advantage of the microporous suction material is that it leaves no adhesive or other residue after removal from a nonporous surface. This is particularly advantageous when used on delicate surfaces or surfaces on which residue is undesirable, such as on a display device (e.g., a television, tablet, smartphone, laptop, etc.) on a wall, a window, or other nonporous surfaces.

In some embodiments the body 110 forms the majority of the volume of the block 102. Various types of materials can be used to form the body of the block including, metal, wood, plastic, foam, etc. In some embodiments the body 110 is formed of a lightweight deformable foam. For example, some embodiments include a body 110 formed of soft and flexible foam, such as made of a combination of materials as ethyl vinyl acetate (EVA) and polyurethane, to provide soft building blocks suitable for all ages from pre-school children to adults. In some embodiments the foam has a density in a range from about 2 to about 5 pounds per cubic foot. One advantage of using a soft foam material as opposed to harder materials such as plastic is that the foam blocks will not scratch or easily break a delicate nonporous assembly surface S (FIG. 1), such as a window, wall, television (e.g., flat screen television), telecommunications device, appliance, or display of a mobile computing device. Additionally, the foam material can also provide a desirable tactile sensation that makes them more appealing to hold in a person's hand while playing with them or constructing a three-dimensional structure 104 (FIG. 1). A further advantage of foam is that it can be further customized by the user with knives or scissors to alter the shape of the block to achieve a particular shape.

In this example shown in FIG. 3, the building block 102 has a body 110 having a thickness T1. In some embodiments the thickness T1 is in a range from about 1/8" to about 2". The microporous suction layer 120 has a thickness T2. In some embodiments the thickness T2 is in a range from about 0.1 mm to about 0.3 mm, and in another embodiment in a range from about 0.15 mm to about 0.18 mm. The nonporous layer 122 has a thickness T3. In some embodiments the thickness T3 is in a range from about 100 nm to about 0.3 mm. Other embodiments can have dimensions outside of these example ranges.

Figure 4:
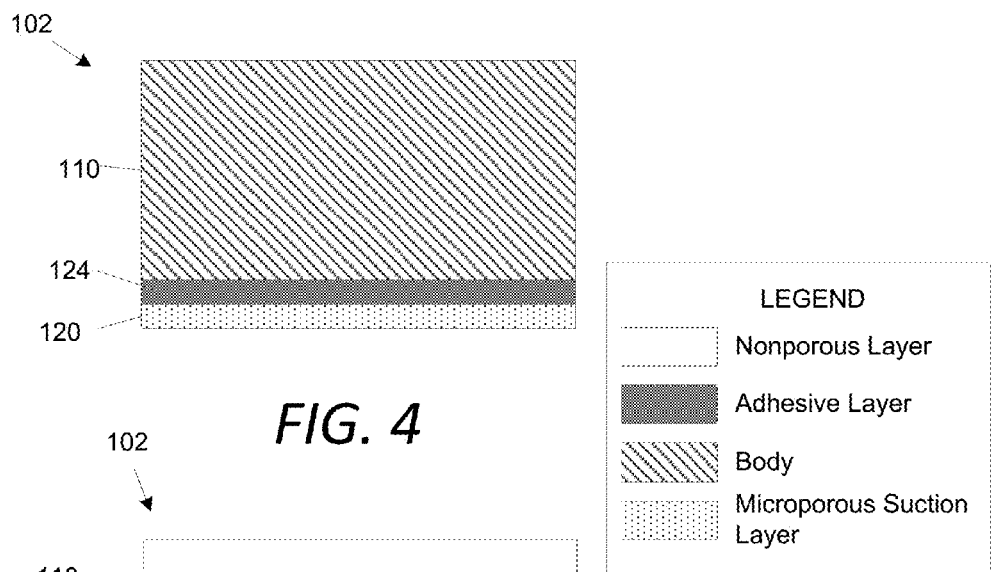
FIG. 4 is a cross-sectional view of an embodiment of a building block.
Figure 5:
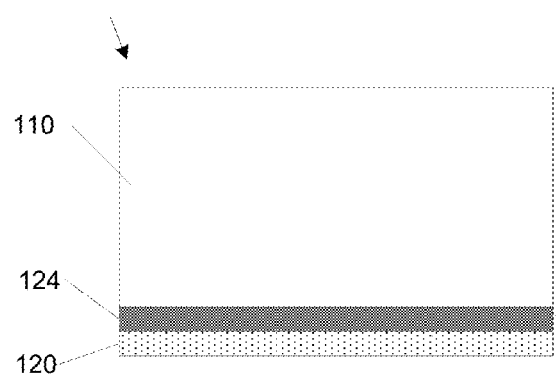
FIG. 5 is a cross-sectional view of an embodiment of a building block.
Figure 6:
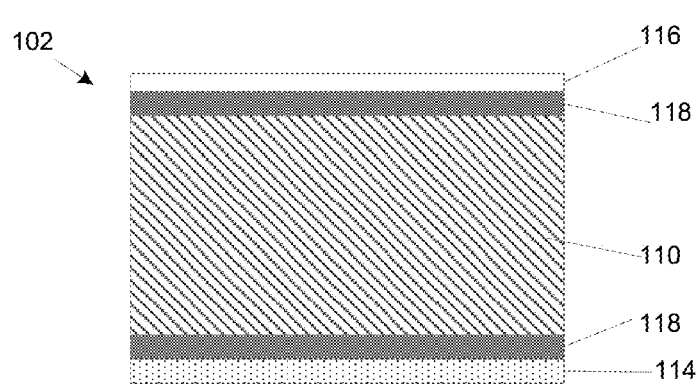
FIG. 6 is a cross-sectional view of an embodiment of a building block.

FIGS. 4-6 depict several example alternative embodiments of building blocks 102.

FIG. 4 depicts an example building block 102 including a body 110 having only a microporous suction layer 120 and no separate nonporous layer. In this example, the microporous suction layer 120 is connected to the body 110 by an adhesive layer 124. This example building block 102 is useful for connecting to a nonporous surface S (FIG. 1), for example, but does not itself have a nonporous surface to which other building blocks 102 can be connected.

FIG. 5 depicts an example building block 102 including a body 110 that is either composed completely of a nonporous material or whose exterior surfaces 112 are coated with a nonporous material. The example building block also includes a microporous suction layer 120 connected to a surface of the body by an adhesive layer 124. In this example all of the surfaces of the building block 102 (including the nonporous surfaces and the microporous suction surface) can be used for connecting the building block 102 with one or more other building blocks.

FIG. 6 depicts the example building block 102 shown in FIG. 3, but without the protective layer 128 shown in FIG. 3.

Although the layers are shown in these examples as being connected to the top or bottom surfaces of the body 110, it is recognized that the layers (such as the microporous suction layer 120 and the nonporous layer 122) can alternatively be connected to any one or more of the other surfaces (e.g., any of the side surfaces) of the body 110 in yet other embodiments, and also that a plurality of one or more of such layers can be connected to multiple surfaces of the body 110 in further embodiments.

Figure 7:
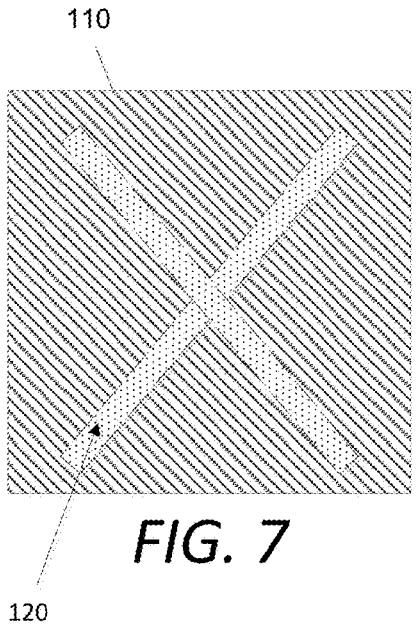
FIG. 7 is a bottom view of an embodiment of a building block.
Figure 8:
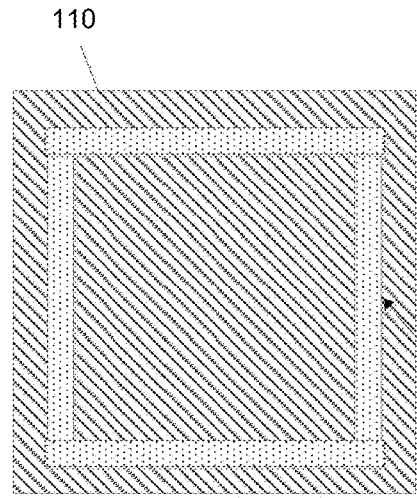
FIG. 8 is a bottom view of an embodiment of a building block.
Figure 9:
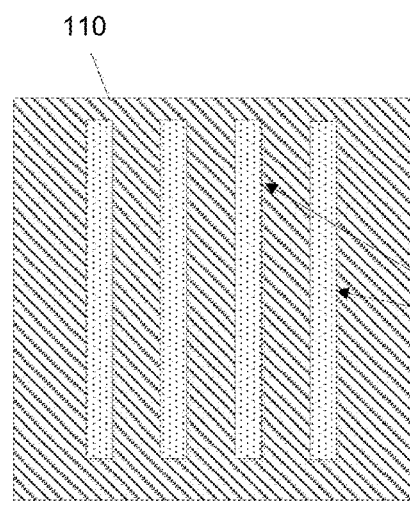
FIG. 9 is a bottom view of an embodiment of a building block.

FIGS. 7-9 are bottom views of several example building blocks 102, and illustrate several examples of the microporous suction layer 120. Each of these examples illustrates the microporous suction layer 120 being formed of elongate strips of material. FIG. 7 illustrates an example in which two thin strips of microporous suction material are arranged in an x-shaped configuration, extending between opposing corners of the body 110. FIG. 8 illustrates an example in which four strips of microporous suction material are arranged in a square or rectangular shape. FIG. 9 illustrates an example in which multiple strips are arranged so that they are parallel to one another, spaced from one another, and distributed across the surface of the body 110.

The microporous suction layer 120 typically provides a determinable amount of holding force per unit area. As one example, the microporous suction layer 120 provides from about 5 to about 8 Newtons (such as about 6.37 N) of force per 50 mm^2, on a glass surface. Accordingly, selecting an appropriate amount of the microporous material to include on the body 110 allows the selection of an amount of holding force for the microporous suction layer. For example, if a single strip has a known amount of holding force, two strips of the same size will have twice the holding force, and four strips will have four times the holding force. Accordingly, a desired holding force can be obtained for a given building block 102 by including a corresponding amount of the microporous material in the microporous suction layer 120.

Figure 10:
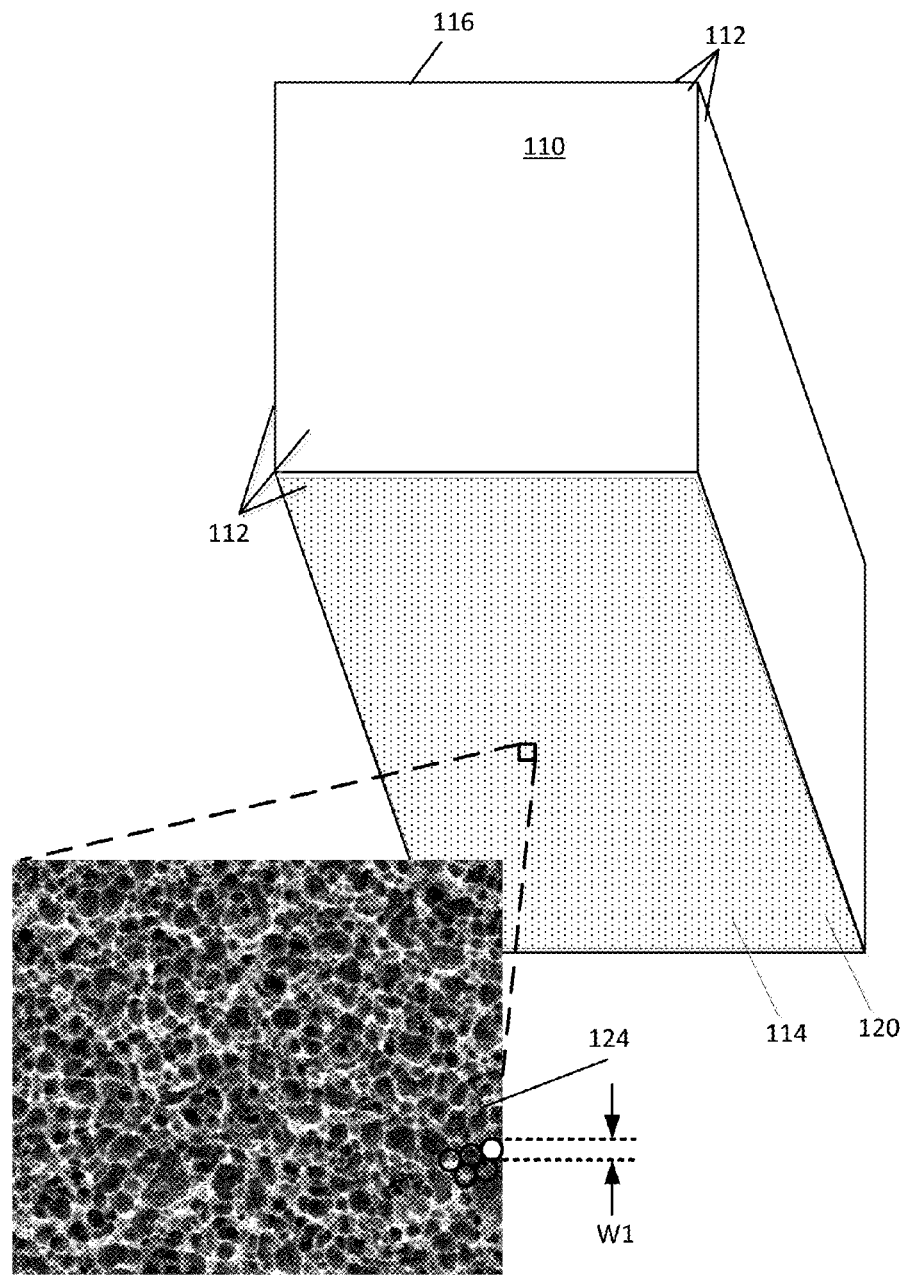
FIG. 10 is a magnified view of an example microporous suction layer of a building block.

FIG. 10 is another perspective view of a block 102 depicting a magnified view of an example of the microporous suction layer 120 including a plurality of micropores 140. The microporous suction layer 120 includes a microporous suction surface 114 that contains a plurality of pores. The term microporous is used herein to refer to a material having exposed pores that are at most on the order of micrometers in size or smaller, including materials having pores that are on the order of nanometers in size. In other words, a microporous material has exposed pores with a width W1 that is less than 500 micrometers across, and also includes materials having pores with width W1 of less than 1,000 nanometers. The term microporous suction refers to a material having micropores that provide suction when applied to a nonporous surface. In some embodiments a width W1 of the pores of the microporous suction layer is in a range from about 0.1 micrometers to about 100 micrometers. In some embodiments W1 is less than 500, 300, 100, 10, 1, or 0.1 micrometers. In some embodiments the pores are arranged in a uniform pattern, while in other embodiments the pores are irregularly distributed and may have varying sizes and shapes, as well as various spacings between the adjacent pores. One example of a suitable microporous suction material and the microporous suction layer 120 is a material available under the trade name Regabond-S White, available from Exel Trading Co. Ltd, of Tokyo, Japan.

Figure 11:
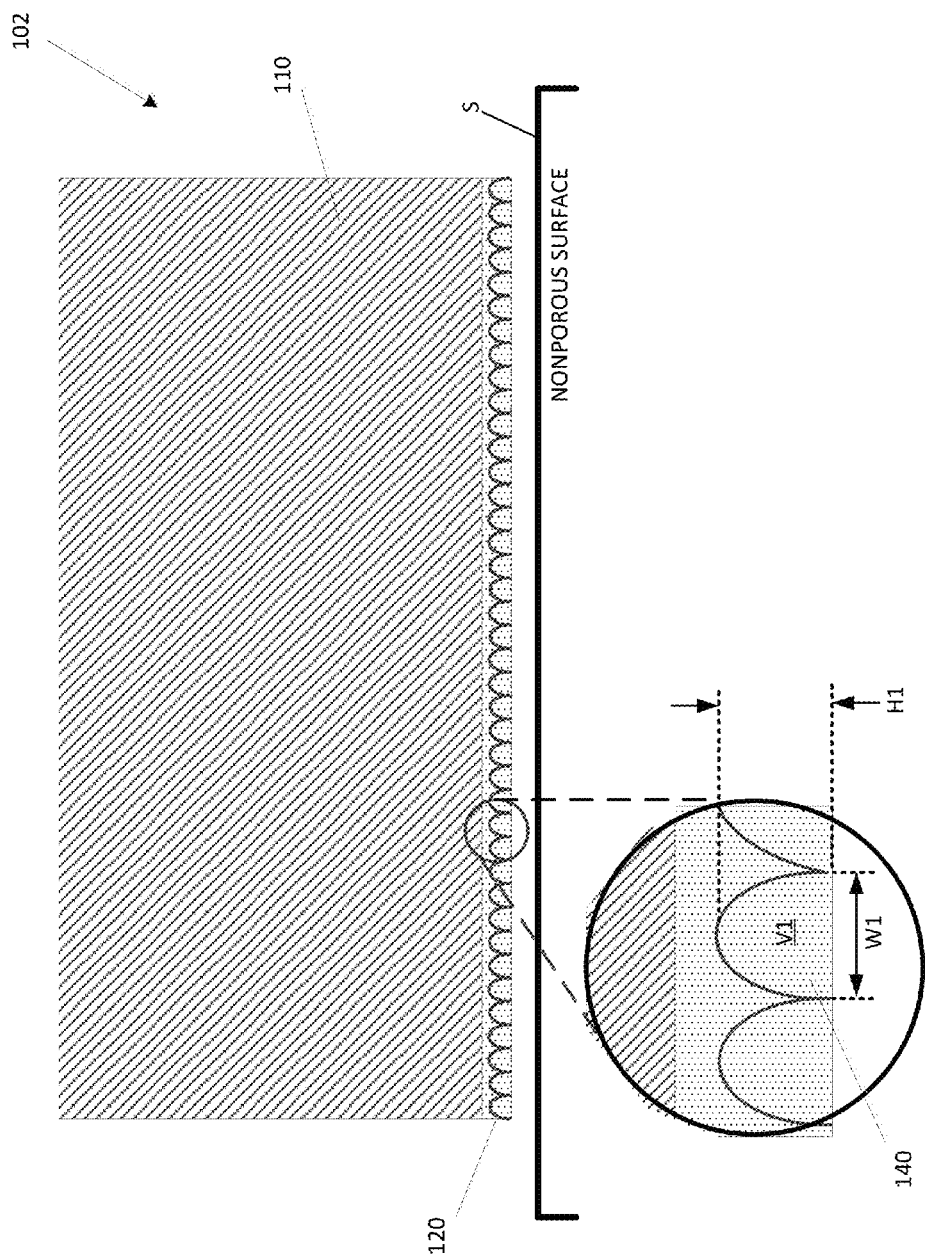
FIG. 11 is a cross-sectional view of an example building block, illustrating the microporous suction layer prior to connection with a nonporous surface.
Figure 12:
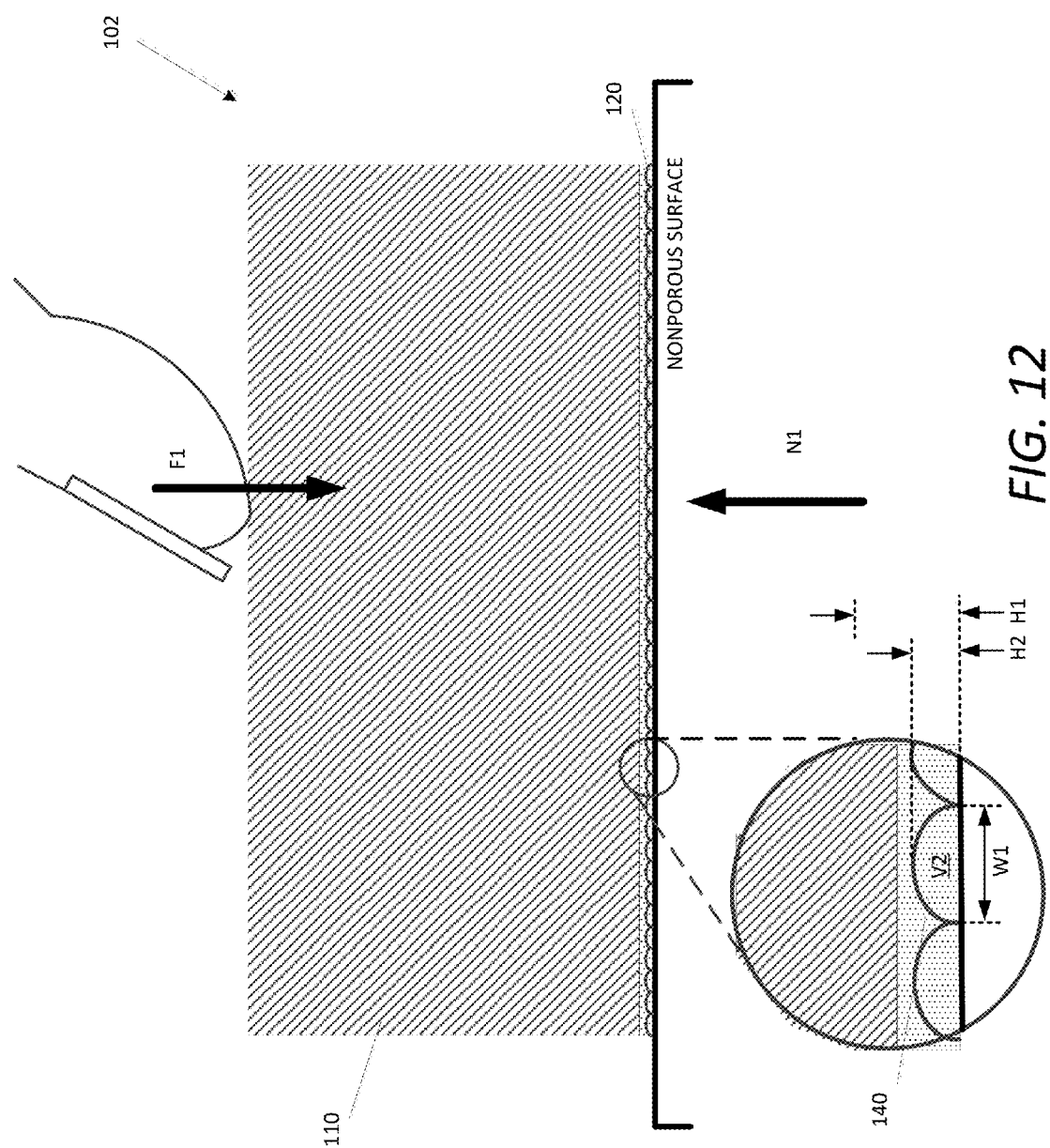
FIG. 12 is another cross-sectional view of the example building block of FIG. 11, illustrating the microporous suction layer after connection to a nonporous surface.

FIGS. 11-12 illustrate the connection of the block 102 to a nonporous surface S. FIG. 11 is a schematic cross-sectional view of the building block 102 prior to connection with a nonporous surface S, and FIG. 12 is a schematic cross-sectional view of the building block after connection with a nonporous surface S. The building block 102 includes the body 110 and the microporous suction layer 120. A plurality of micropores are present in the microporous suction layer 120, including micropore 140.

In this example, the microporous suction layer 120 includes a plurality of micropores including the micropore 140. Before the microporous suction layer 120 has been connected to the nonporous surface S, the micropore 140 has dimensions including a width W1 and a height H1. The micropore 140 also has a volume V1 that is a function of the pore's width W1 and height H1.

The nonporous surface can be formed of a variety of materials having various hardnesses, ranging from soft flexible materials to relatively hard materials. For example, in some embodiments the nonporous surface can range from 0 to 100 on the Shore 00 scale to 0 to 100 on the Shore D scale.

Referring to FIG. 12, the block 102 is connected to the nonporous surface S by placing the building block 102 against the nonporous surface S and applying a force F1. As discussed earlier, the body 110 can be comprised of a material that is rigid or deformable. In either case, a portion of the force F1 will be translated to the microporous suction layer 120. The portion of the translated force impacts the microporous suction layer 120 by causing it to deform and compress. When the microporous suction layer 120 compresses, the height of the micropore 140 decreases from H1 to H2, which decreases the volume of the micropore 140 from V1 to V2. When the volume of the micropore 140 decreases, air is forced out of the pore and into the surrounding atmosphere. A seal is then formed between the microporous suction layer 120 and the nonporous surface, which prevents air from returning into the micropore 140. Being that the nonporous surface S is sufficiently impermeable to air, air cannot enter the micropore 140 through the nonporous surface S, and therefore the suction vacuum is maintained. Once the air has been evacuated from the pores collectively, an imbalance in pressure will occur. The pressure between the interface of the nonporous surface S and the microporous suction layer 120 will be less that the pressure of the surrounding atmosphere, causing the building block 102 to firmly connected to the nonporous surface S. In addition to connecting with nonporous surfaces, the microporous suction surfaces can also connect well with one another, utilizing the joint suction vacuums created by both of the joining surfaces to provide a strong connection between the two microporous suction surfaces.

Figure 13:
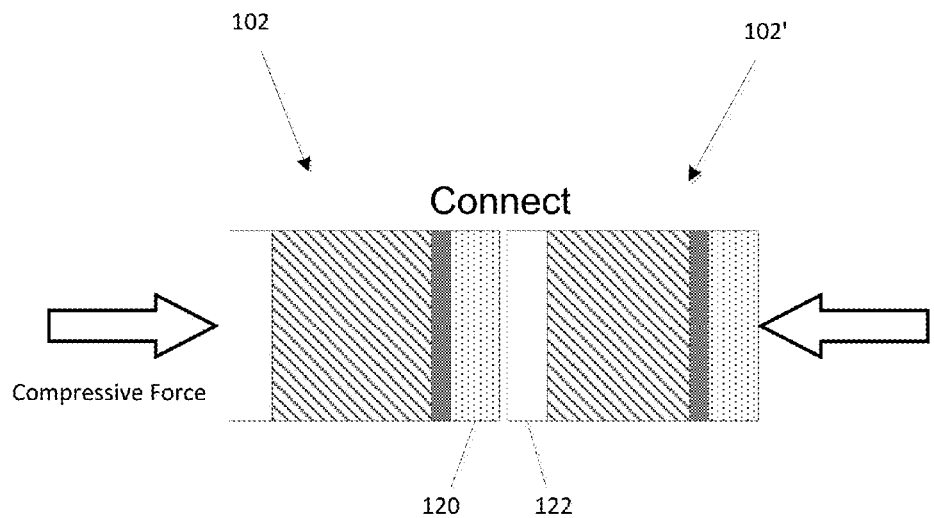
FIG. 13 is a side view depicting the interaction of two blocks during connection.
Figure 14:
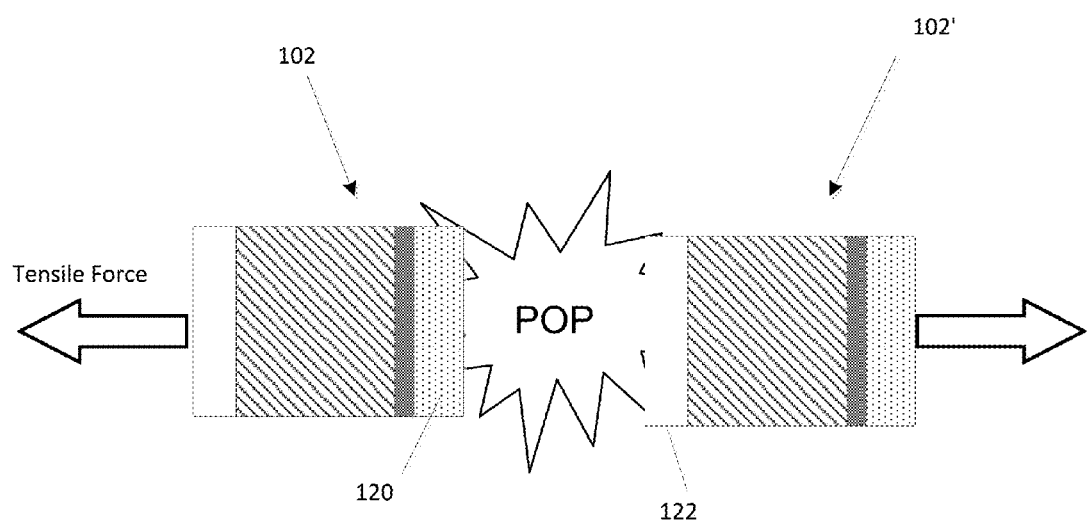
FIG. 14 is a side view depicting the interaction of two blocks during disconnection.

FIGS. 13-14 are side views illustrating an example of two blocks being connected and disconnected, respectively. In this example, the blocks include a first block 102 in proximity to a second block 102'. As discussed before, the microporous suction layer 120 of one respective block 102 is connected to a nonporous layer 122 of a second block 102'. The arrows are representative of the force used to compress the two blocks together. FIG. 14 depicts a representation when the two blocks are pulled apart. As shown in the FIG. 14, the force is applied in the opposite direction transitioning from a compressive force to a tensile force. During this step, the compressed dimensions of the pores return to their original dimensions. In the process, the vacuum is removed and the flow of air back into the volume V1 generates a popping sound. The novel popping sound is another unique aspect of the building blocks 102 that provides an auditory sensation that may be particularly appealing when used by children in play.

Figure 15:
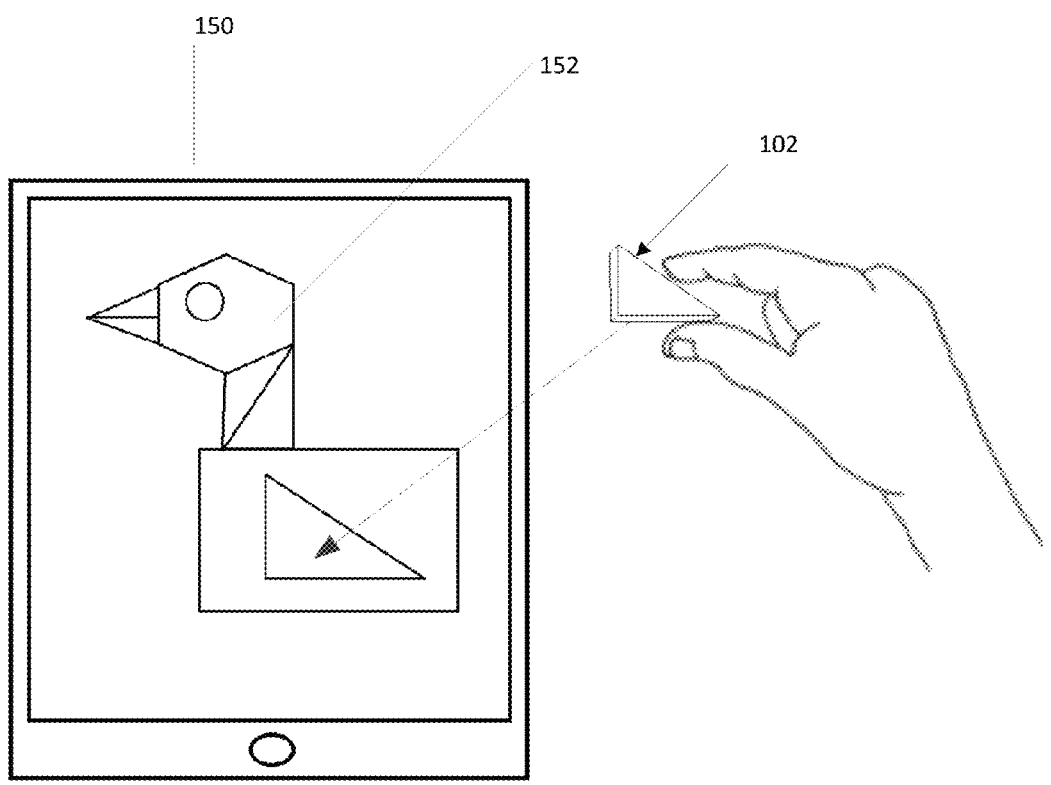
FIG. 15 is a block diagram illustrating an example mobile computing device operating a building unit construction guide application, and further illustrating the user interacting with the mobile computing device to construct a three-dimensional structure from building blocks on the mobile computing device.

FIG. 15 is a block diagram illustrating an example mobile computing device 150 operating a building unit construction guide application, and further illustrating the user interacting with the mobile computing device 150 to construct a three-dimensional structure from building blocks 102 on the mobile computing device 150. Each building block 102 includes a microporous suction layer 120 that reversibly adheres to the transparent nonporous glass surface S of the mobile computing device 150. In this manner the user follows the template displayed on the display device of the mobile computing device to assemble individual pieces into a three-dimensional structure.

A computing device, such as a mobile computing device 150, typically includes at least one processing device, at least one computer readable storage medium, at least one user input device, and a display device. For example, in some embodiments a building unit construction guide application is stored in the computer readable medium, which when executed by the processing device causes the processing device to perform certain functions. In another possible embodiment, the building unit construction guide application is a web browser or other local application operating in cooperation with a remote server computing device, such as by communicating across a data communication network.

In the illustrated example, the building unit construction guide application provides a graphical user interface to interact with the user during the construction of a three-dimensional structure. For example, the building unit construction guide application displays a plan 152 for the construction of at least a portion of the three-dimensional structure, in order to prompt the user to construct the three-dimensional structure directly on the display device of the mobile computing device. For example, the user identifies a building block corresponding to a portion of the plan, and then places the building block 102 on the screen over the image of the building block in the plan 152. The building unit construction guide application can also interact with the user via sound or graphically through animations, instructions, and the like, to guide the user through the construction of the three-dimensional structure. In this way the user can be prompted to construct three-dimensional structures on a variety of different devices, including TVs, laptops, desktop computer monitors, tablet computers, smart phones, and the like. Such devices typically have a display formed of a nonporous surface, and therefore the building blocks 102 can be connected thereto.

In at least some embodiments a significant advantage of the building units containing a microporous suction surface is that assembly can be performed and maintained under conditions where disassembly would normally occur e.g. vibrations and rapid movement in a car or plane.

Figure 16:
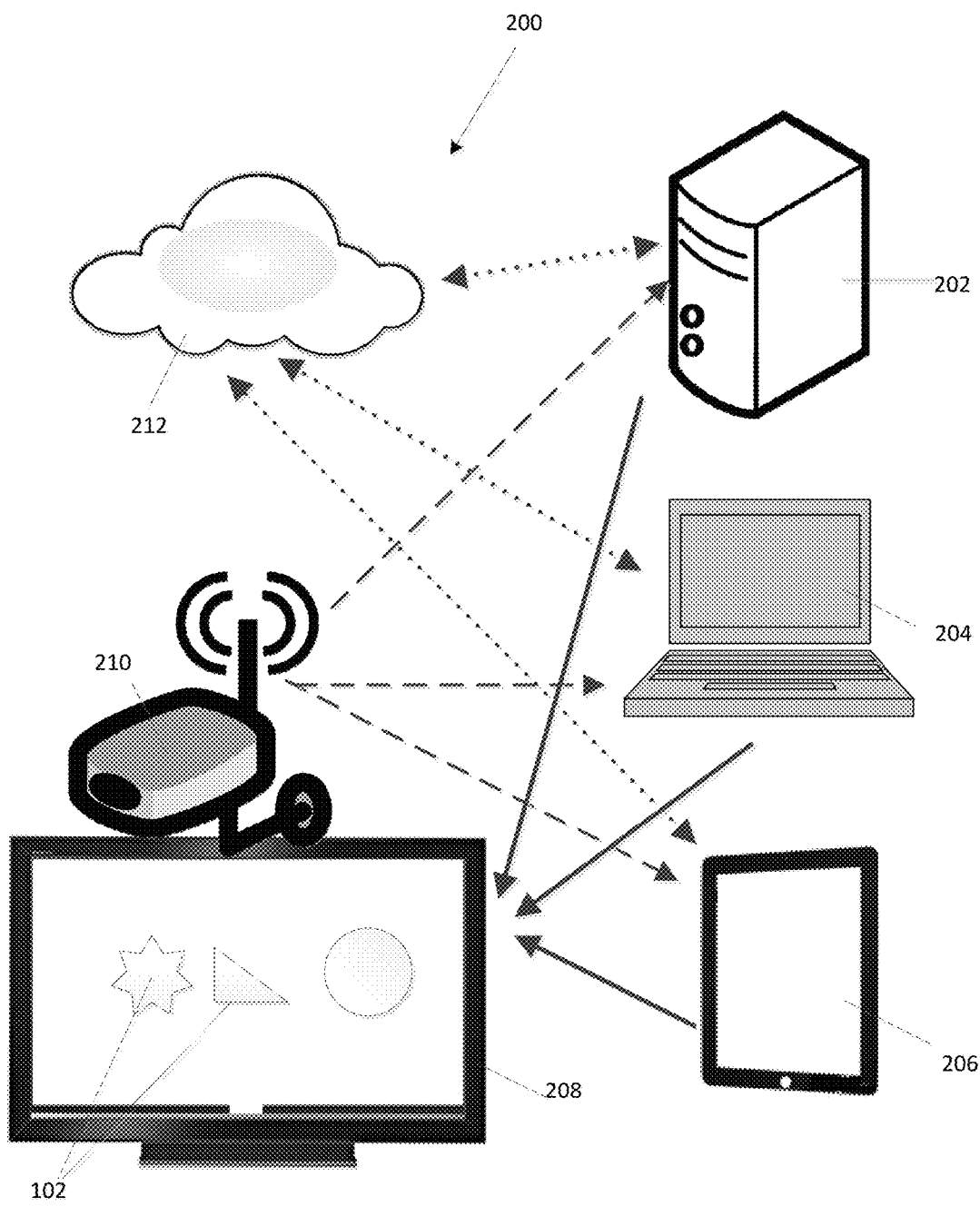
FIG. 16 is a system for guiding the user to construct a three-dimensional structure using the building units.

FIG. 16 is a schematic diagram illustrating an example three-dimensional building system 200. In this example, the system 200 includes a server 202, a desktop computer 204, a mobile computing device 206, a television 208, a digital color image capture device 210, and a cloud storage 212.

Learning the diverse array of geometric shapes and their assembly into three dimensional constructs is an important aspect of early childhood education. Currently, pattern blocks and two dimensional cutouts are the media most often employed to facilitate this learning experience. More recently, computer applications have been developed to digitally mimic these physical educational tools. The aforementioned approaches represent two independent means for acquiring these cognition skills. The example system 200 provides a method of integrating computer-based education with physical three-dimensional object. In this way children are taught important motor skills by physically manipulating three dimensional objects, while providing the advantages of computer-based education including audiovisual interaction with visual or audio prompts provided through an application or web-based interface. As shown, the same interaction can also be provided on a television 208 or other video display device.

FIG. 16 demonstrates a system 200 to provide an exciting new approach in early childhood education to integrate electronic learning with the manipulation of real physical objects. Different geometries and patterns are learned through the assembly of building units 102 having diverse shapes, on the surface of flat screen digital televisions 208 or digital displays 204 with instantaneous feedback provided to the user by means of video and audio prompts. Further, the ability to employ flat screen digital television screens 208 as templates for the assembly of shapes removes a significant limitation of screen size in the design of learning programs and applications.

In one example embodiment, a digital color image capture device 210 (e.g. digital color camera or three dimensional scanning device (e.g., the Microsoft® Kinect® device)) is utilized to identify the size, shape and color of three dimensional objects adhered to the surface of flat screen digital televisions or digital monitors. To define the size, shape, and color of the adhered building units 102, the image captured with the digital color image capture device is converted into digital format to be analyzed and identified by image recognition software or by comparison with a digital library of shapes having different sizes and colors utilizing an electronic computational device. The digital information defining shape, size, and color is then available for utilization in learning and entertainment programs and applications that are displayed on flat screen digital televisions or digital monitors.

In one example, a single or multiple digital color camera(s) are mounted at one or more edges of a flat screen digital television or digital monitor. The camera is mounted so that the lens of the camera faces the screen in a manner that provides a focused view of the active surface of the flat screen digital television or digital monitor. The shape, size, and color of the adhered three dimensional objects are captured in the form of digital image files e.g. TIFF or JPEG or digital video files e.g. MPEG, MP4, for example. The digital image files are transmitted through a hard wire connector or WIFI connection to an electronic computing device such as the desktop computer 204, mobile computing device 206, or television 208 to be analyzed and identified by image recognition software, computer vision, or comparison with a digital library of shapes having different sizes and colors. The digital library may be stored in a server 202 or cloud storage 212, for example.

Figure 17:
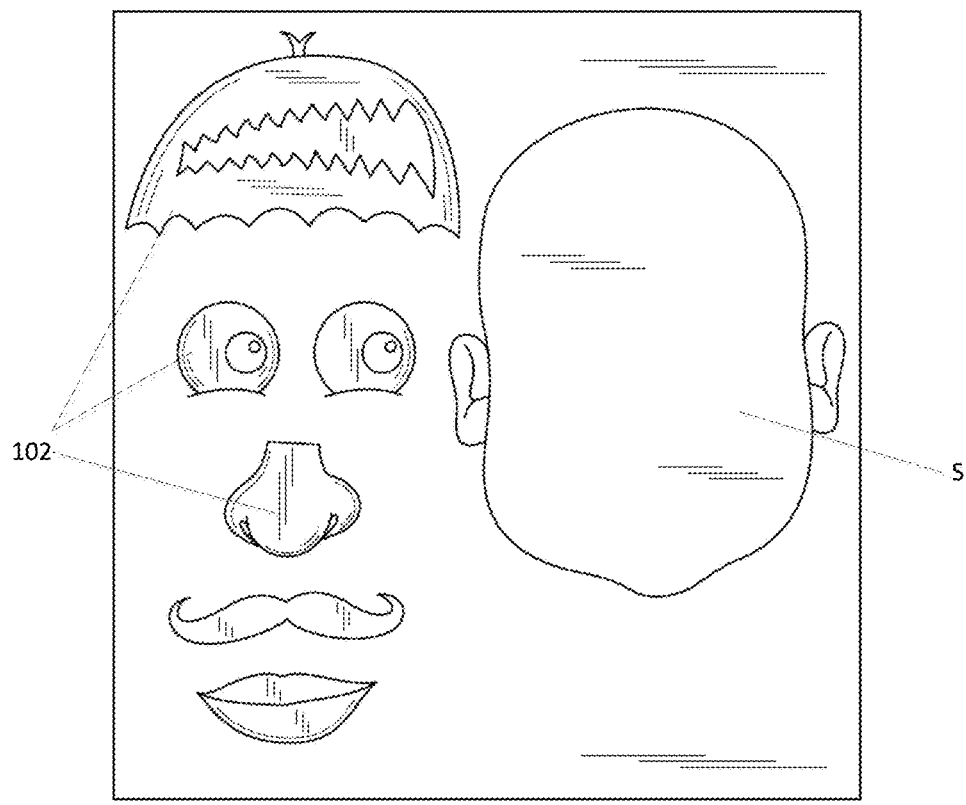
FIG. 17 is a front view of a facial template and a plurality of building units constructed as facial features.

FIG. 17 is a front view of a facial template and a plurality of building units constructed as facial features. The facial template can be shown a blank canvas in the shape of a face. In this embodiment, the plurality of building units can be constructed to represent individual facial features including topical hair, facial hair nose, mouth eyes, lips, and fashion accessories. The plurality of facial features can then be applied to the template. In alternative embodiments, entire body figure templates can be used where building units comprising clothing and fashion accessories can be created as well.

Figure 18:
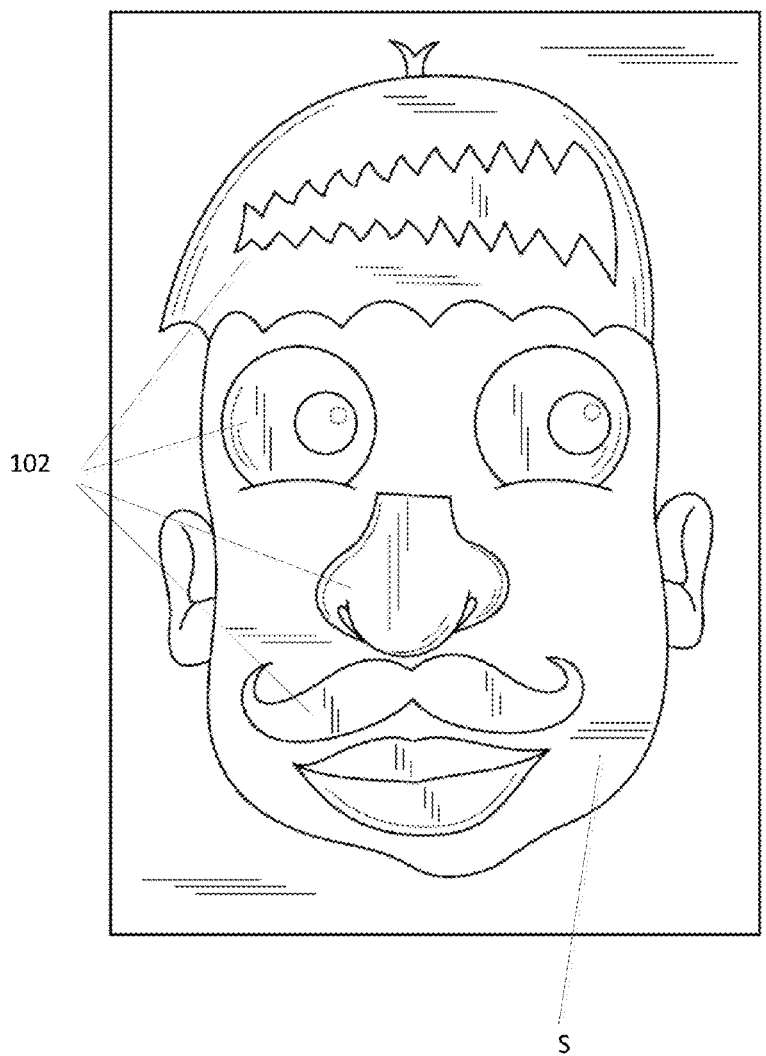
FIG. 18 is a front view of an assembled facial template that can be assembled using building units constructed as facial features.

FIG. 18 is a front view of an assembled facial template that can be assembled using building units constructed as facial features. The user is not limited to a standard arrangement of facial features.

Figure 19:
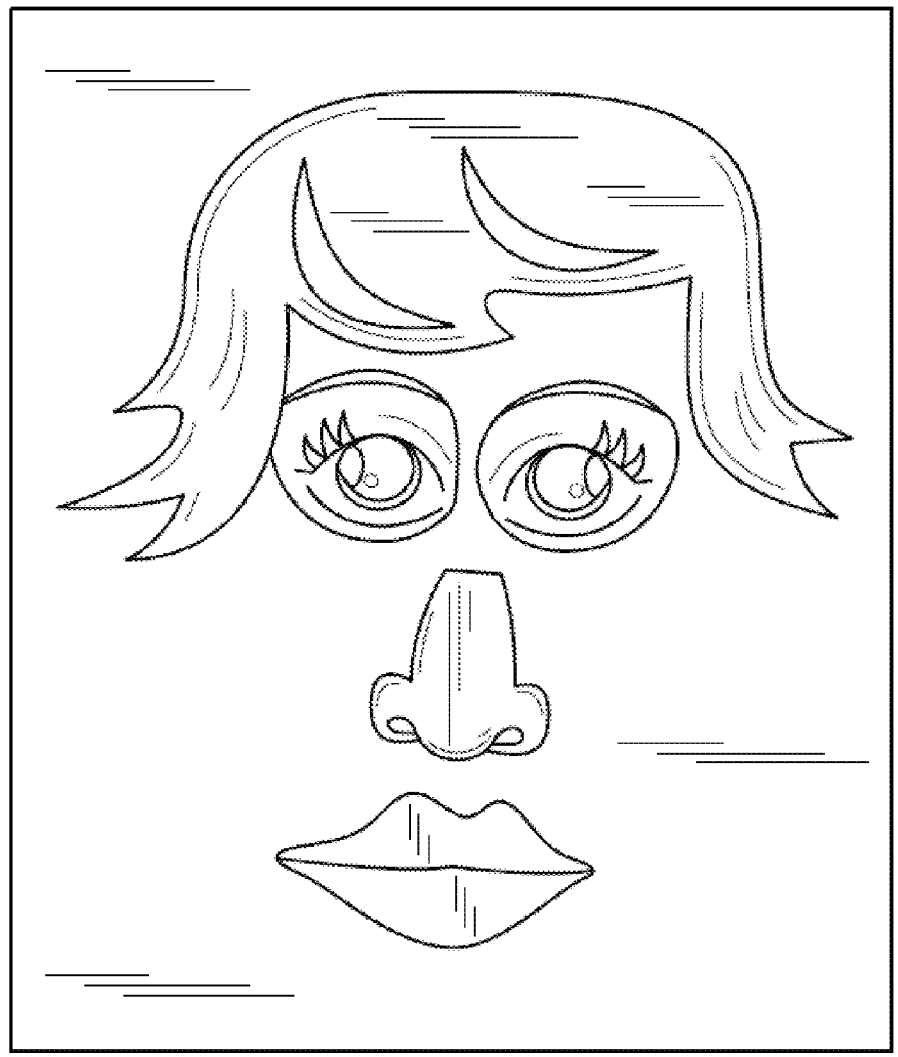
FIG. 19 is a front view of an arrangement of a plurality of building units constructed as facial features.

FIG. 19 is a front view of an arrangement of a plurality of building units constructed as facial features. FIG. 19 depicts an embodiment without a facial template. Being that the building units can be constructed with a microporous suction surface, they can be directly adhered to any nonporous surface.

Figure 20:
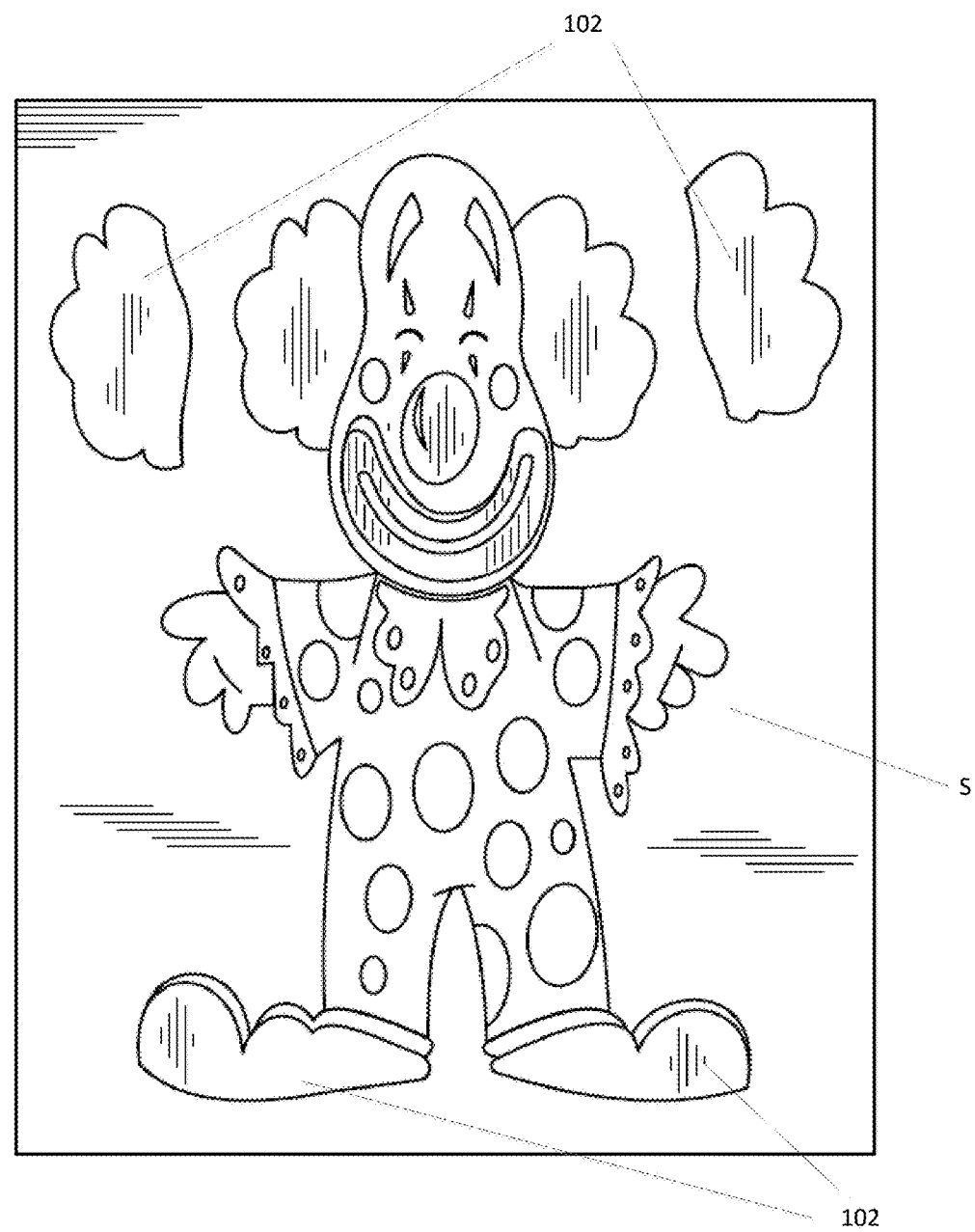
FIG. 20 is a front view of a template of a cartoon and a plurality of building units that are configured for a corresponding feature of a template.

FIG. 20 is a front view of a template of a cartoon and a plurality of building units that are configured for a corresponding feature of a template. FIG. 20 depicts an elaborate template in the form of a clown. In the embodiment, clown template can itself be an embodiment similar to FIG. 3. In this case, the clown template adheres to a nonporous surface and then is able to receive other building units being adhered to its top nonporous surface. This is embodied by the blue hair that can be adhered to the matching areas of the clown template.

Figure 21:
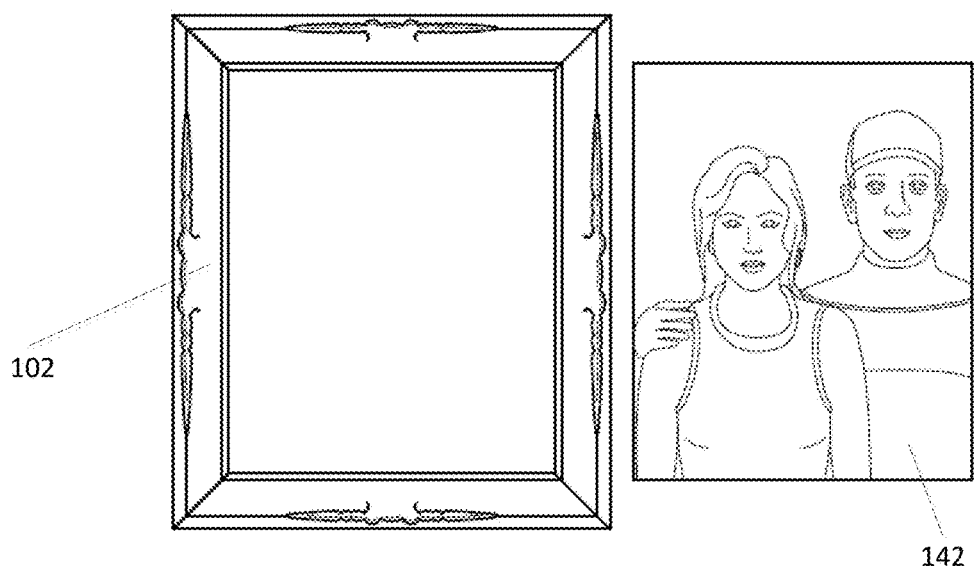
FIG. 21 is a front view of a building unit in the form of frame or border and a picture that can be framed by the frame or border.

FIG. 21 is a front view of a building unit 102 in the form of frame or border. In the embodiment, a picture 142 can framed by building unit in the shape of picture frame. During assembly the frame can be place around the picture, artwork, etc. and adhered to a nonporous surface S. In other embodiments, the picture frame can have various designs. In another aspect of the embodiment, the frame can be assembled from a plurality of building units 102.

Figure 22:
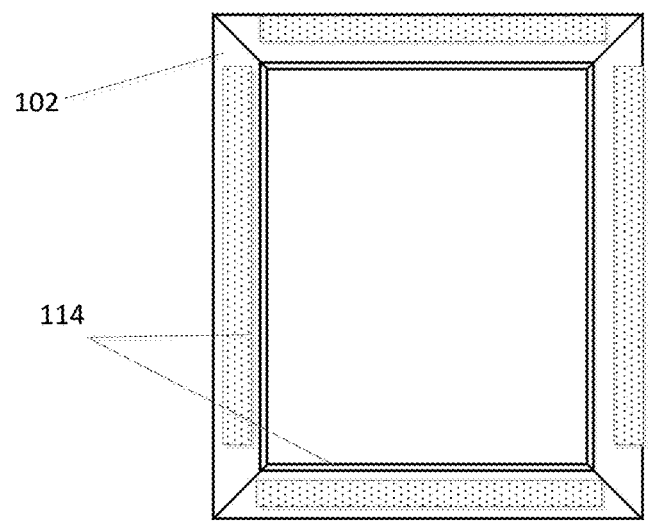
FIG. 22 is a back view of a building unit in the form of frame or border.

FIG. 22 is a back view of the frame or border shown in FIG. 21. As shown in FIG. 22, the microporous suction 114 strips are shown. In order to mount the picture 142 (FIG. 21), the picture can be placed in the frame arrangement.

Figure 23:
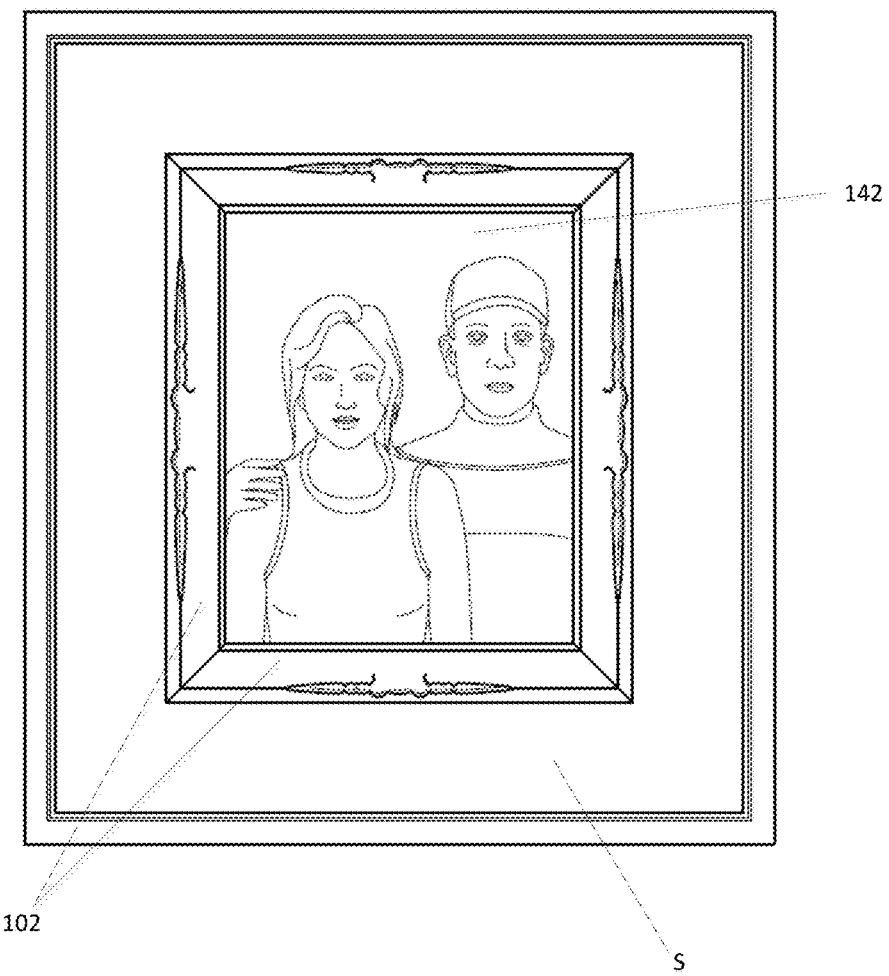
FIG. 23 is a front view of a building unit in the form of frame or border and picture mounted to a nonporous surface.

FIG. 23 is a front view of framed building unit and a picture 142 and mounted to the nonporous surface S.

In some embodiments, the building blocks described herein utilize a connection mechanism that makes it quick and easy to build a three-dimensional structure. The connection mechanism is easy to connect with only a small force being needed. In addition, in some embodiment the blocks can be easily separated from each other, such as by slightly twisting the block to release the suction cup connection gradually from one side to another side, thereby requiring only a fraction of the total force that can be held by the microsuction cups collectively across a surface. These features make the building blocks more enjoyable to build with and result in less frustration than building blocks that are more difficult to connect or disconnect. Furthermore, a three-dimensional structure can be made very quickly. Additionally, although one may take the time to carefully align the building blocks together, there is no need for such careful alignment, as the building blocks can be connected together regardless of whether their sides are aligned or not. Further, the shape of the foam blocks can be easily customized either during manufacturing or by the end user using cutting machinery or by hand cutting tools such as scissors or a knife. Finally, because building units can take a variety of different forms, the building units can be used for a variety of purposes, such as to create a building, or other creative avenue, such as a pattern, border design, or simulated face to name a few.

The various embodiments described above are provided by way of illustration only and should not be construed to limit the claims attached hereto. Those skilled in the art will readily recognize various modifications and changes that may be made without following the example embodiments and applications illustrated and described herein, and without departing from the true spirit and scope of the following claims.

What is claimed:

1. A system for facilitating construction of a three-dimensional structure on a computing device, the system comprising:
    a computing device including a processing device, a data storage device, and a display device, wherein the data storage device stores data instructions that, when executed by the processing device, cause the computing device to generate and display a graphical user interface on the display device that guides construction of a three-dimensional structure on the display device, wherein the display device comprises a nonporous surface on which the graphical user interface is visible; and
    a plurality of building units configured for attachment to the nonporous surface to construct the three-dimensional structure, wherein the building units comprise:
        a body comprising at least a first body surface and a second body surface;
        a first external layer comprising a nonporous film wherein the nonporous film is attached to the first body surface; and
        a second external layer comprising a microporous suction layer wherein the microporous suction layer is attached to the second body surface, and wherein the microporous suction layer is configured to attach a respective one of the building units to the nonporous surface of the display device or to the nonporous film of another building unit.

2. The system of claim 1, wherein the plurality of building units are building blocks that have a parallelepiped shape.

3. The system of claim 1, wherein at least some of the plurality of building units are non-parallelepiped shaped.

4. The system of claim 1, wherein the nonporous film and the microporous suction layer are attached by an adhesive layer.

5. The system of claim 1, wherein at least some of the plurality of building units have two or more nonporous surfaces.

6. The system of claim 1, wherein at least some of the plurality of building units have two or more microporous suction layers.

7. The system of claim 1, wherein the body comprises a deformable foam material.

8. The system of claim 1, wherein the nonporous film is a coating.

9. The system of claim 1, wherein the microporous suction layer leaves no residue when detached from the nonporous surface of the display device or the nonporous film of another building unit.

10. The system of claim 1, wherein the first external layer and the second external layer are transparent.

11. The system of claim 1, wherein the computing device comprises a non-transitory readable medium storing data instructions executable by the computing device, wherein the data instructions, when executed by the computing device, cause the computing device to generate the graphical user interface and to guide the user in constructing a three dimensional structure from the building units on the nonporous surface.

12. A system for facilitating construction of a three-dimensional structure on a computing device, the system comprising:

a data storage device storing data instructions that, when executed by the processing device, cause the processing device to generate and display a graphical user interface on the display device that guides a user in the construction of a three-dimensional structure on a nonporous surface of a display device associated with the processing device; and a plurality of building units configured for attachment to the nonporous surface, wherein the building units comprise:

a body comprising at least a first body surface and a second body surface;

a first external layer comprising a nonporous film wherein the nonporous film is attached to the first body surface; and a second external layer comprising a microporous suction layer wherein the microporous suction layer is attached to the second body surface, and wherein the microporous suction layer is configured to attach a respective one of the building units to the nonporous surface of the display device or to the nonporous film of another building unit.

13. A method of facilitating construction of a three-dimensional structure formed of a plurality of building units on a computing device, the method comprising:

generating and displaying a graphical user interface on a display device using a computing device, the display device including a non-porous surface, wherein the graphical user interface is displayed so that it is visible on the nonporous surface; and providing instructions to a user to guide the user in constructing a three dimensional structure from building units on the graphical user interface visible on the nonporous surface, wherein the building units comprise a body, a first surface, and a second surface, wherein the first surface has a nonporous structure, and wherein the second surface has an exposed microporous suction structure.

14. The method of claim 13, wherein the graphical user interface is a template identifying a location on the nonporous surface for placement of one or more building units on the nonporous surface.

* * * * *